Sept. 29, 1953     A. J. ROCHOW     2,653,776

TWINE HOLDER

Filed Oct. 12, 1949

INVENTOR.
ARTHUR J. ROCHOW
BY
HIS ATTORNEY

Patented Sept. 29, 1953

2,653,776

UNITED STATES PATENT OFFICE 2,653,776

TWINE HOLDER

Arthur J. Rochow, Pittsford, N. Y.

Application October 12, 1949, Serial No. 120,956

2 Claims. (Cl. 242—142)

This invention relates to containers for twine, thread, and the like, provided with cutting means which can safely and conveniently be used to sever the twine.

One object of the invention is to provide a container of the above character having a more simple, economical and practical construction.

Another object is to provide such a container capable of being rapidly and economically manufactured.

Another object is to provide such a container that is compact, lightweight, rigid and easily assembled.

Another object is to provide a container having the above advantages and provided with a quickly replaceable cutting means, detachably held in an external receptacle integral with said twine holder.

Another object is to provide such a container that is essentially dust and moisture proof, which will keep the twine clean and dry.

Another object is to supply a container having the above advantages and when desired provided with a transparent body so that the amount of twine remaining can readily be determined.

To these and other ends the invention resides in certain improvements and combinations of parts, all as will be hereinafter more fully described, the novel features being pointed out in the claims at the end of the specification.

Figure 1:
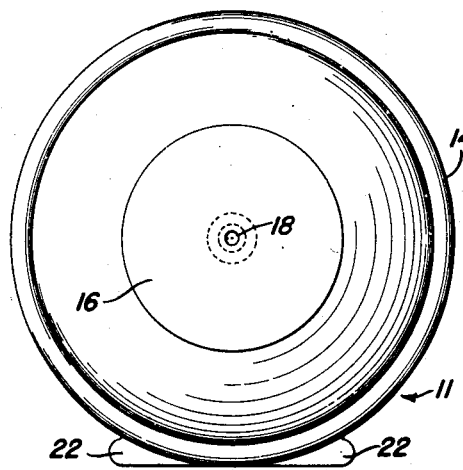
Fig. 1 is a top plan view.
Figure 3:
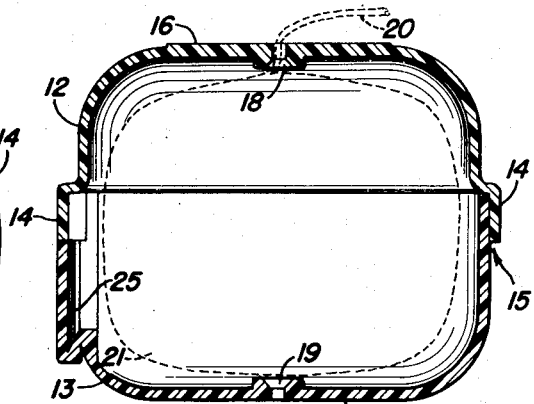
Fig. 3 is a sectional elevation on line 3—3 in Fig. 2.

The embodiment of the invention herein disclosed by way of illustration comprises, preferably, a two-piece, hollow container shown generally at 11, comprising a substantially cupshaped top member 12 and a similarly shaped bottom member 13. Top 12 at its open end is provided with an outwardly projecting edge of slightly larger diameter forming a lip or flange 14 into which the open end of bottom member 13 snugly fits as shown generally at 15, Figs. 2 and 3, thereby forming a hollow container, suitable for holding twine, string, and the like. The top and bottom ends of said container are flattened to form two parallel circular surfaces, 16 and 17, respectively, upon which said container may be positioned with substantial stability. Each of said surfaces is provided with a small hole, 18 and 19, respectively, through either of which the loose end 20 of the twine 21 may pass. Top 12 has on lip 14 of its open end two externally and oppositely projecting flanges 22 forming essentially a flat surface projecting outwardly from and at right angles to said lip to form part of a guard and retaining member for the cutting means which will hereinafter be described. These flanges 22 merge into the perimeter of the lip 14 where they approach each other, as shown, so that they actually form two separate flanges although their outer edges extend in alignment with each other.

Figure 2:
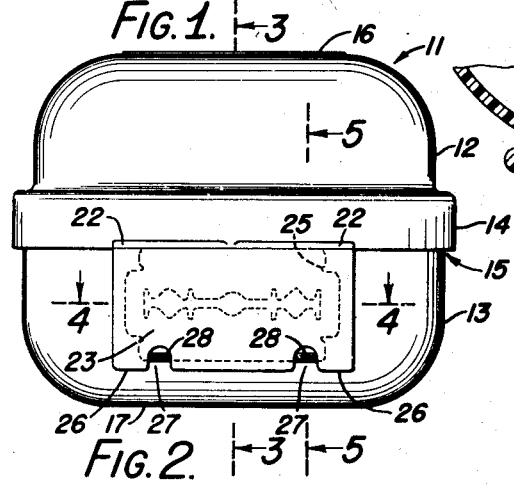
Fig. 2 is a front elevation with the cutting means shown by dotted lines.
Figures 4, 5:
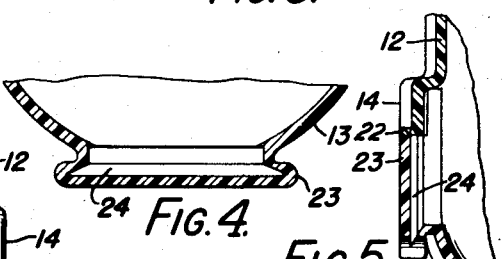
Fig. 4 is a fragmentary sectional plan view on line 4—4 in Fig. 2.
Fig. 5 is a fragmentary sectional end elevation on line 5—5 in Fig. 2.

Bottom member 13 has integrally formed therewith an external rectangularly shaped, shallow receptacle 23, Fig. 2, suitable for holding a cutting means or razor blade 25. Said receptacle is provided with a longitudinal slot-like or narrow opening 24 in the upper edge thereof as shown, for the insertion or removal of said blade 25 and has its lower edge 26 formed with a plurality of notches 27 exposing portions of the cutting edge 28 of said blade 25.

When members 12 and 13 are fitted together, flanges 22 cover the upper slot-like opening 24 of said receptacle 23 thereby preventing accidental contact with or removal of the cutting means. The cutting means 25 preferably comprises a standard-size, single or double edge commercial razor blade.

Figure 7:
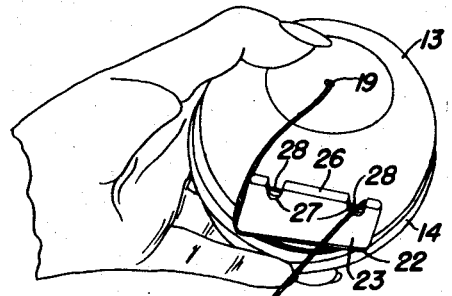
Fig. 7 is another perspective view showing the twine emerging from the opposite end of said container and in another cutting position.
Figure 6:
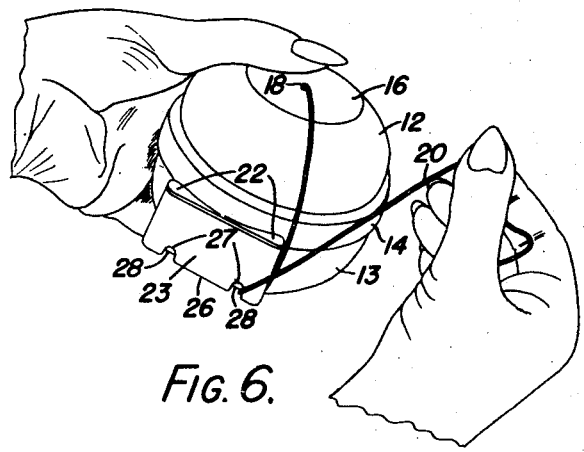
Fig. 6 is a smaller perspective view showing the twine in one position for severage.

To assemble the container it is only necessary to insert a razor blade 25 in slot 24 and enclose a ball of twine 21 within members 12 and 13 the open ends of which then may be frictionally and tightly fitted together to enclose and retain the twin ball, while flanges 22 cover and close the upper edge of the slot-like opening 24. The loose end 20 of the twine threaded through the hole 18 of top 12, may be pulled out until the desired length is reached when it may be pulled into either of notches 27 and over the cutting edge 28 as shown in Fig. 6, to quickly sever the desired length from the ball. If desired, the twine may be fed through hole 19 in the bottom of member 13, around the receptacle 23 and pulled into either of notches 27 and across cutting edge 28 as shown in Fig. 7.

It is evident from the above description that the top and bottom members 12 and 13 are so shaped and arranged that they may readily be molded of plastic material in a rapid manner to produce a smoothly finished, rigid and strong construction with a minimum of manufacturing operations and cost. In this preferred method of manufacture, one of the known transparent plastic molding materials is conveniently utilized to produce a container with transparent walls through which the contents may be readily inspected. Such a material, furthermore, is substantially unbreakable. Holes 18 and 19 may be molded or subsequently bored and the two members fitted together, to complete the container for packaging. If desired, either or both the cutting means and the twine may be inserted at this point and the article thus made completely ready for use.

The container may be held in the hands, or, if desired, it can be fastened to a flat surface by a screw or other suitable means inserted through either of holes 18 and 19, as may be found more convenient.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A hollow container for twine, thread and the like comprising two substantially cup-shaped sections made of moldable material and each having a closed end and an open end, said sections having the open ends thereof telescopically and detachably fitting together, one of said sections having an integrally associated, narrow receptacle lying substantially parallel with a side wall of its section, for holding a razor blade, said receptacle having an opening at one side thereof adjacent the open end of its section for removably receiving said blade and a notch at the other side thereof for exposing a cutting edge of said blade, the other of said sections having an integrally associated projection member arranged to cover and close the first mentioned opening of said receptacle to retain said blade therein when the container sections are assembled together, one of said sections having a twine eyelet in its closed end and the other section having an opening in its closed end for the reception of means for securing said container to a support.

2. A hollow container for twine, thread and the like comprising two substantially cup-shaped sections made of moldable material and of substantially equal depth, each having an open end and a closed end, said sections having the open ends thereof telescopically and detachably fitting together, one of said sections having an integrally associated, narrow receptacle lying substantially parallel with a side wall of the section, for detachably and reversibly holding a razor blade, said receptacle having closed ends and an opening at the side thereof adjacent the open end of its section for removably receiving said blade, the other side of said receptacle being closed except for a notch of small size for safely exposing a portion of the adjacent cutting edge of said blade, the other of said sections having an integrally associated projection arranged to cover and close the opening of said receptacle at the open end of said section for retaining the blade in the receptacle when the sections are assembled together, one of said sections having an opening therein for withdrawing twine.

ARTHUR J. ROCHOW.

References Cited in the file of this patent

UNITED STATES PATENTS

| Number | Name | Date |
| --- | --- | --- |
| 751,214 | Steeb | Feb. 2, 1904 |
| 1,040,490 | Bauer | Oct. 8, 1912 |
| 1,040,740 | Niswonger | Oct. 8, 1912 |
| 1,050,118 | Farrell | Jan. 14, 1913 |
| 2,240,675 | Selinger | May 6, 1941 |
| 2,304,501 | Hommer | Dec. 8, 1942 |
| 2,323,968 | Bayer | July 13, 1943 |

FOREIGN PATENTS

| Number | Country | Date |
| --- | --- | --- |
| 325,323 | Great Britain | Feb. 20, 1930 |